May 28, 1929.  W. JOHNSTON  1,714,561
AERO VEHICLE
Filed Dec. 28, 1927   3 Sheets-Sheet 2
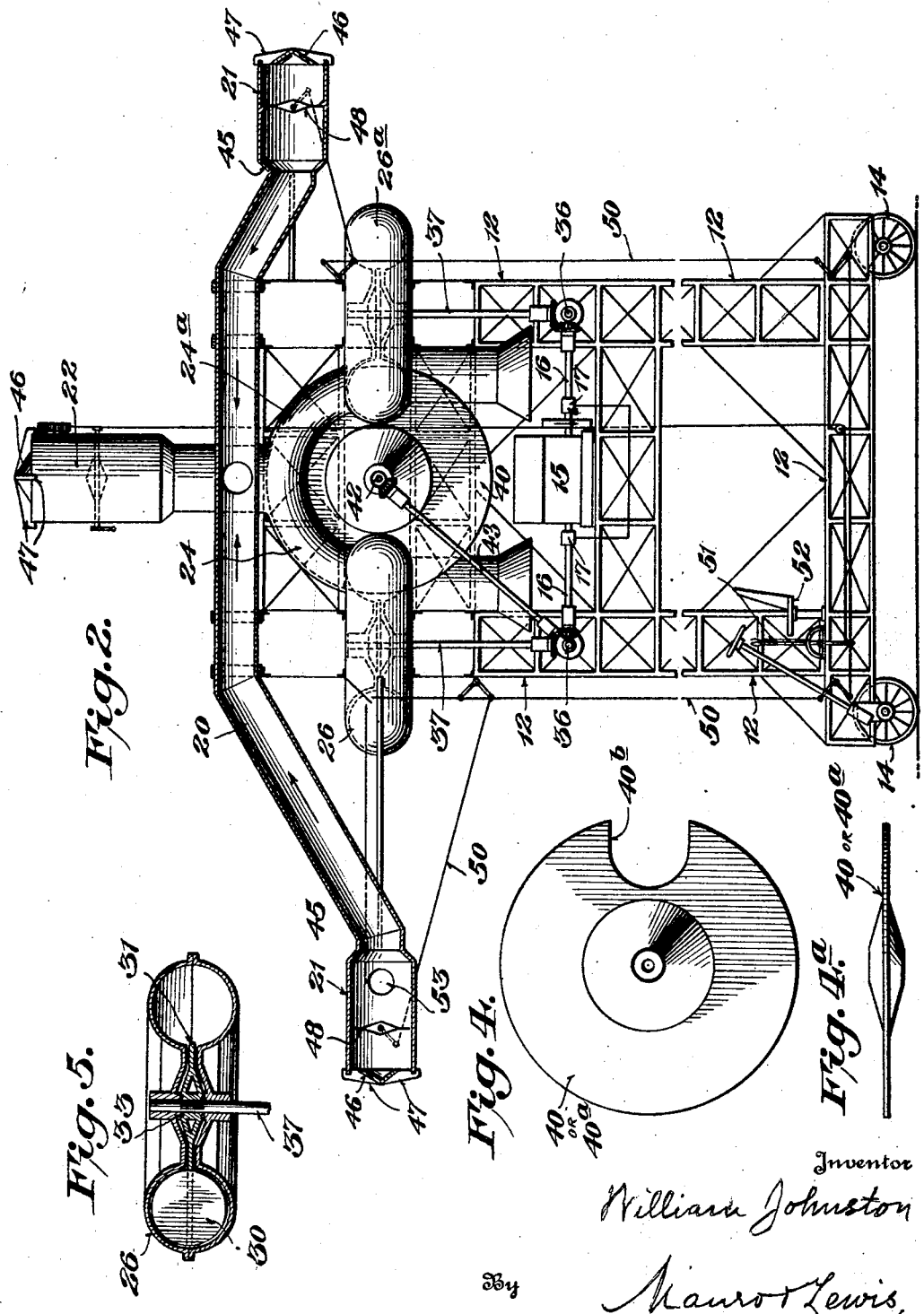
Inventor
William Johnston
By Mauro & Lewis,
Attorneys

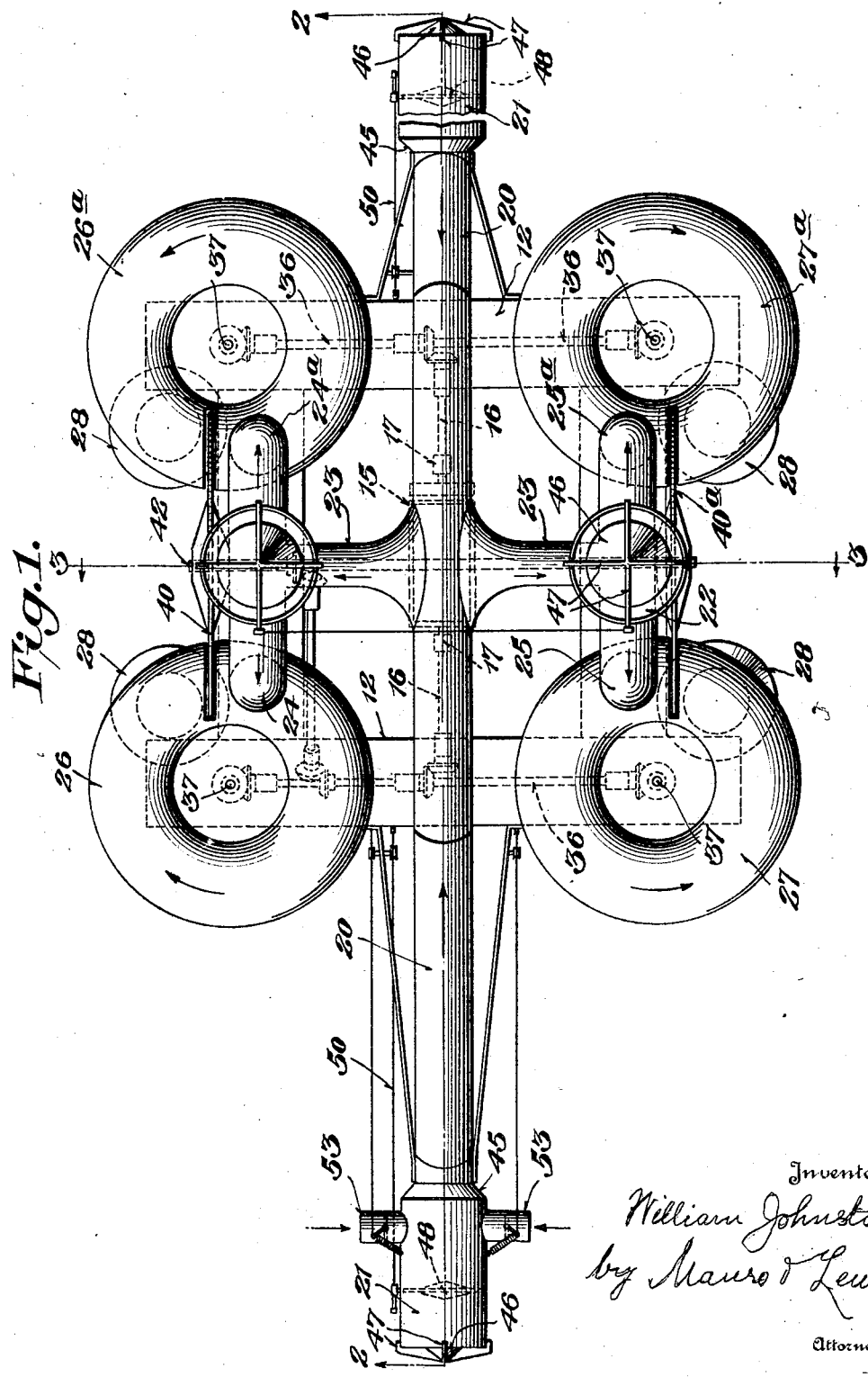

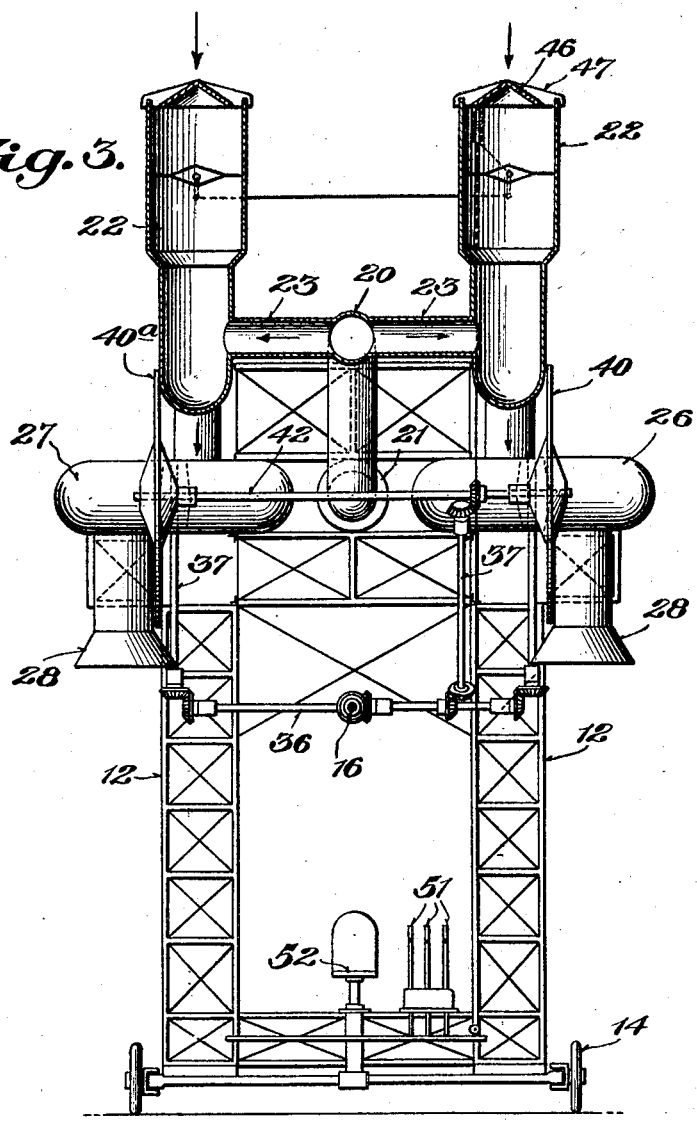

Patented May 28, 1929.

1,714,561

UNITED STATES PATENT OFFICE.

WILLIAM JOHNSTON, OF HONOLULU, TERRITORY OF HAWAII.

AERO VEHICLE.

Application filed December 28, 1927. Serial No. 243,150.

This invention has reference to aeronautical vehicles. It has for its major object to provide a vehicle of that class which shall be capable of rising vertically from the ground, of descending vertically at controlled speed, of moving horizontally (forward or backward), of turning horizontally so as to advance in any direction, and of poising at any altitude above the ground; and which, with all the above characteristics, shall have a relatively high coefficient of safety.

A further object of the invention is to produce an aero vehicle capable of flying close to the ground, that being a characteristic conducing to safety.

A further object is to produce a vehicle of the above class whose motions are all effected by an air pump of special design, characterized by high efficiency, simplicity of construction, compactness, and relatively small weight.

Further objects of the invention will be set forth in the following description, in which reference will be made to the accompanying drawings, wherein is illustrated what is regarded at the present time as the preferred embodiment of my said invention; it being understood, however, that said embodiment is given by way of example only, and not as limiting the invention to the details of construction and arrangement of the various parts thereof.

In said drawings:

Fig. 1 is a top plan view of the vehicle;

Fig. 2 is a vertical longitudinal section on the central line 2—2 thereof;

Fig. 3 is a vertical cross section on line 3—3 in elevation looking forward, as indicated by arrows (Fig. 1).

Figs. 4, 4ª are details of the revolving shut-off for the suction chambers;

Fig. 5 is a detail in cross-section of one of the suction chambers.

The working parts of the vehicle are mounted upon a frame-work 12 of any approved construction, wherein rigidity and lightness are combined. It is composed of suitable verticle and horizontal members, which can be arranged in various ways. It is preferably provided with wheels 14 for locomotion on the ground.

Power for levitation and propulsion of the vehicle is supplied by an engine 15, preferably of the high speed air-cooled type; which may be of any standard make, and may be mounted on any convenient part of the frame. As shown, engine 15 is placed where the central longitudinal plane of the vehicle intersects the central cross plane thereof, that being the location which conduces best to stability. The main power shaft 16 of the engine may be provided with clutches, as at 17, 17, for coupling and uncoupling; said clutches being connected for simultaneous operation, as well understood. From main shaft 16 power is transmitted to the moving parts of the air pumping mechanism by means of suitable gearing, as hereinafter pointed out in detail.

The movements of the vehicle are effected by the action of air currents, which are drawn in by the suction apparatus hereafter described, either downwardly (for vertical motion upward or for sustained poising) or lengthwise (for motion either forward or backward) or laterally (for steering, or change of direction horizontally). By suitable combinations of these motions the vehicle may be caused to move in any direction, vertically, horizontally, or obliquely.

The several air ducts or passages are preferably, as shown in the accompanying drawings, connected together in such manner as to form one intercommunicating system; but this part of the mechanism can take a variety of forms, being susceptible of many different arrangements. That shown in the drawings is therefore to be taken merely as an illustrative example.

As there shown, a duct or tube 20 extends lengthwise of the vehicle from front to rear, and is provided at each end with an air-intake or traction head casing 21, presently to be described. There may be two or even more, of these longitudinal ducts.

Associated with the longitudinal duct 20 are two vertical ducts or tubes 22. These may be disposed one on each side of duct 20 and equidistant therefrom; and they are connected therewith by lateral ducts 23. Thus the air that is drawn in by way of duct 20, whether at its forward or at its rear end, will divide at the junction with cross ducts 23, and a part (approximately half) will pass to one of the vertical ducts 22 and part to the other.

Each of these vertical ducts branches at its lower end into two ducts or tubes (24, 24ª and 25, 25ª). Each of these four branch ducts connects with and discharges into a suction chamber. There are four of these chambers, and they are of identical construction, each being annular in form and circular in cross section (Fig. 5). The four chambers are grouped in pairs, 26, 26ª and 27, 27ª. Each suction chamber has on its underside a discharge pipe 28, which terminates in a flaring nozzle (Fig. 3).

By reference to Fig. 1 it will be seen that the inlet and outlet of each suction chamber are so arranged relatively to each other that the air, after entering the chamber, traverses almost the entire circumference thereof before it reaches the outlet (see arrows). The direction of the air current through the chamber is determined by a revolving suction device consisting of a single disk-shaped vane or blade 30. Vane 30 fits, as closely as consistent with freedom of movement, the interior of the circular chamber, and is attached to a horizontal circular web or disk 31, carried by a vertical spindle 37, mounted in antifriction bearings 33, located at the center of the chamber. It will be understood that this part of the apparatus, to wit, the suction chambers and their enclosed suction mechanism, must be constructed with the utmost nicety, with a view to strength, lightness, and exactitude of measurements, in order to assure the most effective operation. The chamber may be made conveniently in halves, which are joined together in a horizontal plane, as shown in Fig. 5. The support 31 for the suction disk or vane 30 is preferably a circular web composed of two metal disks, bulging out from each other, as shown at the central part thereof, where they join the hub. Care should be taken that this revolving suction member be well balanced; for it must rotate at high speed.

The power transmitting connections for these rotatory suction members consist of horizontal cross shafts 36 (Figs. 1 and 3) connected by bevel gears with main shaft 16, vertical shafts 37, four in number geared to cross shaft 36 (Fig. 3), the revolving suction member being mounted on the upper end of the corresponding shaft 37.

In association with each pair of suction chambers, (26, 26ª and 27, 27ª) is a revolving shut-off 40, 40ª, which is in the form of a disk, shown in detail in Fig. 4, each disk being mounted on one end of cross shaft 42 (Figs. 1 and 3) which is driven from one of the cross shafts 37, through the obliquely disposed arbor 43 (Fig. 2), the connections between the several shafts being by means of bevel gears, as shown. Shut-off disk 40 cooperates with suction chambers 26, 26ª, and disk 40ª with chambers 27, 27ª (Fig. 1). Each disk 40, 40ª extends on one side through a narrow vertical slit in one of its pair of suction chambers, and on the other side through a like slit in the other of the pair; and its location relatively to said chambers is such (see Fig. 1) that it constitutes a partition or shut-off between the inlet 24 (or 25) and the outlet 28 thereof. Thus the air is compelled to take the direction of the arrows, Fig. 1, which is the direction of rotation of the suction disk or vane 30.

Each shut-off disk 40, 40ª, has a notch 40ᵇ (Fig. 4) whose form and dimensions are approximately the same as those of the suction disk 30, being only enough larger to permit the free passage of said disk through the same; and the parts are so disposed relatively to each other, and their respective movements are so timed, that the crossing of the suction chamber by the notch 40ᵇ synchronizes with the crossing of the plane of shut-off disk 40 by suction vane 30. Thus the partition across the suction chamber, constituted by disk 40 and which separates the inlet from the adjacent outlet, is in effect removed for just the fraction of a second that is necessary for the passage of vane 30, and is instantly restored. And it will be observed that vane 30 itself closes the aperture formed by notch 40 as it passes through the same.

Furthermore, the respective suction vanes 30 of each pair of chambers are so disposed relatively to each other and to their shut-off disk 40 (or 40ª) that notch 40ᵇ coincides with each of the pair at the precise moment its vane 30 is crossing the plane of said disk. Thus there is no interruption to the current of air passing through the air ducts, and practically no fluctuation in the pressure of air therein when, at each revolution of disks 40, 40ª, the notch 40ᵇ therein coincides with the interior of the suction chambers. Hence while the mechanism is in operation, each suction vane 30 is, for the greater part of its circular travel, drawing air into its chamber through the inlet thereof, and driving the air in front of it against disk 40, whereby the air is diverted into discharge pipe 28. It is only during that small part of its path when it is approaching the plane of disk 40, and crossing it, that there is any interruption of its effective action.

Each of the main air ducts 20 and 22 has at its inlet end what may be termed a traction casing head. These are, or may be, of identical construction, excepting that one of the traction heads of the longitudinal air duct, preferably the forward head 21, is provided with lateral intakes to serve for steering purposes. Therefore a description of said forward casing head 21 of the longitudinal duct 20 will suffice as a description of all.

Said casing head 21 is larger in diameter than duct 20, and is joined thereto by an inclined shoulder 45 (Figs. 1 and 2) the shapes and relative dimensions being such as to utilize most effectively the difference between the internal and external pressures, to which difference the propulsion of the vehicle is due.

The casing head is partly closed by a cap 46, preferably of conical shape, so as to offer minimum resistance to the atmosphere. Its area is such that the effective area of the inlet is somewhat less than the cross-sectional area of the duct 20. Cap 46 may be attached to casing head 21 in any convenient way, as by ribs or strips 47 (Fig. 1).

Each casing head is provided with a valve or damper 48, which is connected by wires 50, with suitable controlling levers 51, which are, or may be, of a type commonly used in automobiles of standard make, and hence require no description. Control levers 51 are located within reach of the operator when seated upon seat 52 (Figs. 2 and 3).

It will be understood that, for direct vertical motion upwards valves 48 of vertical ducts 22 will be opened, and the down rush of air through said ducts, combined with the reaction of the currents of air issuing from discharge pipes 28, will cause the vehicle to rise, the speed being determined by the amount of the opening of valves or dampers 48.

For forward movement valve 48 of forward casing head 21 will be opened and that of the rear casing head 21ª will be closed. For a backward movement the rear valve would be opened and the forward valve closed.

For the purpose of steering in a horizontal or approximately horizontal plane, the forward casing head 21 has two horizontal valved inlets 53, one on each side; and it will be obvious that, to cause the vehicle to turn as on an imaginary pivot, one of these inlets will be opened and the other closed; and that the turn will be made in the direction of the inlet that is opened.

Although it is not absolutely necessary that the air currents entering by the horizontal duct should unite with those drawn in through the vertical ducts, yet there are important advantages resulting from that arrangement. In the first place it is possible with the air ducts so arranged to make one pumping system serve for all purposes and directions of movement. Furthermore, by deflecting the air currents that enter horizontally and ejecting them downwardly they contribute to the uplift or buoyancy of the vehicle; for there must always be a lift or upward pull sufficient to overcome the force of gravity when the vessel is moving in any direction or is simply poised in the air, and to diminish the force of gravity when a landing is being made.

As shown in Fig. 2, the rear casing head 21ª is at a higher level than the forward casing head 21; it being believed that a more effective utilization of the air pressure during the forward motion of the vehicle is thereby obtained than if both were at the same level.

It is to be understood that the invention is not limited in any way to the number, dimensions, or the relative positions of the longitudinal and vertical air ducts, since it will require experiments under actual service conditions to determine, for example, what should be the cross-sectional areas of the several air ducts in order to obtain the best results.

It is obvious that the air-suction mechanism herein described, which constitutes a compound or quadruplex air-pump, may be used for purposes other than the propulsion of aero vehicles.

I claim:

1. In an aero vehicle, the combination of a longitudinal air duct and vertical air ducts disposed one on each side of said longitudinal duct and connected therewith by branch pipes, thus forming a single intercommunicating air system, and power-driven suction mechanism connected with all said air ducts, each duct having a valved inlet for regulating the amount of air admitted or for closing the inlet, said ducts being arranged to discharge their respective air currents downwardly.

2. In an aero vehicle, the combination of a longitudinal air duct and vertical air ducts, the latter being disposed one on each side of the former, said ducts having each a valved inlet, and all being connected by branch pipes into a single intercommunicating system, power driven suction mechanism connected with said ducts, and controlling devices for the valves in said inlets.

3. The combination with vertical air ducts and exhaust mechanism connected therewith, of a longitudinal air duct also connected with said exhaust mechanism, and having a valved opening at each end, said longitudinal air duct being provided at one end with lateral valved openings projecting horizontally in opposite directions, and controlling mechanism for all the valves.

4. The combination with vertical air ducts and exhaust mechanism therefor, of a longitudinal air duct also connected with said exhaust mechanism, valved inlets at the upper end of each vertical duct and a valve inlet at each end of said longitudinal duct, the forward end thereof being provided also with lateral inlets, both in a horizontal plane but opening in opposite directions.

5. In an aero vehicle, the combination of vertical and longitudinal air ducts, a plurality of annular suction chambers connected by branch pipes severally with said ducts, and having each a discharge opening, a revolving vane in each chamber, a shut-off for each chamber normally separating the inlet from the discharge opening thereof, and means for momentarily removing said shut-off at each revolution of said vane to permit the passage thereof.

6. The combination with the air ducts of a plurality of annular suction chambers, each communicating by a branch pipe with said air ducts and having each a discharge opening, a revolving vane in each chamber fitting the interior thereof, a rotating shut off between the inlet and outlet of each chamber, said shut-off having an aperture which synchronizes with the traverse of said vane across the plane of the shut-off and is of a size and shape to permit the free passage of said vane, and power driven means for operating said vanes and shut-off.

7. The combination with the air ducts of a pair of annular suction chambers having each a revolving vane that fits the interior thereof, a shut-off disk rotating in a plane transverse to that of said chambers, and extending across the path of both vanes, said disk having an aperture which synchronizes with the traverse of each vane across the plane of the disk, and power driven means for operating said vanes and disk.

8. The combination with the air ducts of two pairs of suction chambers of annular form having each a revolving vane that fits the interior thereof, power driven means including shafts and gearing for rotating said vanes, a countershaft, and a disk at each end of said shaft, each disk extending across the path of two of said vanes, the walls of the chambers being slit to admit thereof, and constituting a shut-off for both chambers of a pair, each disk having an aperture of the proper shape and size to permit the passage of the revolving vane, the movements of the several parts being so timed that the aperture coincides with the diameter of each chamber at the instant the vane is crossing the plane of the disk.

9. In an aero vehicle having vertical and horizontal air ducts and power driven suction mechanism connected therewith, a traction casing head for the inlet ends of the several air ducts, said casing head being of larger diameter than the duct to which it is attached, and having a conical cap which closes a part of the area of the air inlet.

In testimony whereof I have signed this specification.

WILLIAM JOHNSTON.